(12) United States Patent
Costello, III et al.

(10) Patent No.: US 7,926,304 B2
(45) Date of Patent: Apr. 19, 2011

(54) METHODS FOR MEASURING THE TENSION OF OPTICAL FIBERS DURING MANUFACTURE

(75) Inventors: John Joseph Costello, III, Lake Elmo, MN (US); Andrey V. Filippov, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 489 days.

(21) Appl. No.: 12/080,853

(22) Filed: Apr. 7, 2008

(65) Prior Publication Data

US 2009/0217710 A1    Sep. 3, 2009

Related U.S. Application Data

(60) Provisional application No. 61/067,486, filed on Feb. 28, 2008.

(51) Int. Cl.
*C03B 37/07* (2006.01)
(52) U.S. Cl. ............... 65/379; 65/377; 65/435; 65/484; 65/486; 65/489
(58) Field of Classification Search .............. 65/379, 65/377, 381, 435, 484, 486, 489
See application file for complete search history.

(56) References Cited

U.S. PATENT DOCUMENTS 5,042,899 A * 8/1991 Le Compte .............. 385/134

FOREIGN PATENT DOCUMENTS

| EP | 0549131 A2 | 11/1992 |
| GB | 2303217 A | 2/2007 |
| JP | 62003037 | 9/1987 |

OTHER PUBLICATIONS

U.S. Appl. No. 11/986764, filed Nov. 26, 2007, "Methods for Producing Optical Fibers".

* cited by examiner

*Primary Examiner* — Queenie Dehghan
(74) *Attorney, Agent, or Firm* — Robert L. Carlson

(57) ABSTRACT

A non-contact method for measuring the tension applied to a drawn optical fiber includes drawing an optical fiber and displacing the optical fiber by applying a pressurized fluid to the optical fiber. The pressurized fluid may be applied to the optical fiber using a fluid bearing. The fluid bearing may include a fiber support channel. The optical fiber may be directed through the fiber support channel and is displaced relative to the fluid bearing by supplying the pressurized fluid to the fiber support channel. The displacement of the optical fiber caused by the application of the pressurized fluid to the optical fiber may then be measured. The tension applied to the optical fiber may then be determined based on the determined displacement.

19 Claims, 6 Drawing Sheets

METHODS FOR MEASURING THE TENSION OF OPTICAL FIBERS DURING MANUFACTURE

CROSS-REFERENCE TO RELATED APPLICATIONS

This application claims the benefit of, and priority to U.S. Provisional Patent Application No. 61/067,486 filed on Feb. 28, 2008, the content of which is relied upon and incorporated herein by reference in its entirety.

BACKGROUND OF THE INVENTION

1. Field of the Invention

The present invention relates to methods for manufacturing optical fibers and, more specifically, to methods for measuring the tension applied to optical fibers during manufacture.

2. Background of the Invention

The measurement of the draw tension applied to an optical fiber during an optical fiber drawing process is critical to the fiber drawing process. Excess draw tension applied to the optical fiber may damage the optical fiber or otherwise adversely effect the properties of the optical fiber. Moreover, excess draw tension may cause the optical fiber to break thereby resulting in costly process downtime while the optical fiber is rerouted through the system and the process is restarted. Current methods for measuring the draw tension applied to an optical fiber during the drawing process include optically measuring the birefringence of the optical fiber during the draw process. The birefringence of the optical fiber is strongly dependent on temperature and the optical properties of the optical fiber. Accordingly, draw tension measurements based on birefringence require regular calibration for each draw. Measuring the mechanical vibration of the optical fiber during the drawing process to determine the draw tension applied to the optical fiber is a more flexible alternative method for measuring the draw tension. However, mechanical vibrations in the optical fiber are susceptible to background acoustic noise generated or present during the drawing process. The acoustic noise may introduce error in the draw tension measurement.

Accordingly, a need exists for methods for measuring the tension applied to an optical fiber during a fiber drawing process which are easily calibrated and are not effected by acoustic noise in the fiber drawing process.

SUMMARY OF THE INVENTION

In one embodiment, a non-contact method for measuring the tension applied to a drawn optical fiber includes drawing an optical fiber and applying a pressurized fluid to the optical fiber to displace and/or reroute the optical fiber. The pressurized fluid may be applied to the optical fiber using, for example, a fluid bearing, one or more jets of pressurized fluid, and/or combinations thereof. The displacement of the optical fiber caused by the application of the pressurized fluid to the optical fiber may then be measured. The tension applied to the optical fiber may then be determined based on the determined displacement and the pressure and/or flow rate of the pressurized fluid.

In another embodiment, a non-contact method for measuring a draw tension applied to an optical fiber in an optical fiber drawing process may include drawing an optical fiber from an optical fiber preform. The optical fiber may then be routed into a fluid bearing. The fluid bearing may include a fiber support channel. The optical fiber may be supported in the fiber support channel on a fluid cushion that is created by supplying pressurized fluid to the fiber support channel. With the optical fiber routed through the fluid bearing, the position of the optical fiber in the fiber support channel may be determined. For a given pressure and/or flow rate of pressurized fluid, the draw tension applied to the optical fiber may then be determined based on the position of the optical fiber in the fiber support channel.

Additional features and advantages of the invention will be set forth in the detailed description which follows, and in part will be readily apparent to those skilled in the art from that description or recognized by practicing the invention as described herein, including the detailed description which follows, the claims, as well as the appended drawings. It is to be understood that both the foregoing general description and the following detailed description present embodiments of the invention, and are intended to provide an overview or framework for understanding the nature and character of the invention as it is claimed.

BRIEF DESCRIPTION OF THE DRAWINGS

The embodiments set forth in the drawings are illustrative in nature and not intended to be limiting of the invention defined by the claims. Moreover, the following description of the specific illustrative embodiments of the present invention can be understood when read in conjunction with the following drawings where similar structure is indicated with like reference numerals and in which:

DETAILED DESCRIPTION OF THE ILLUSTRATIVE EMBODIMENTS

Figure 2:
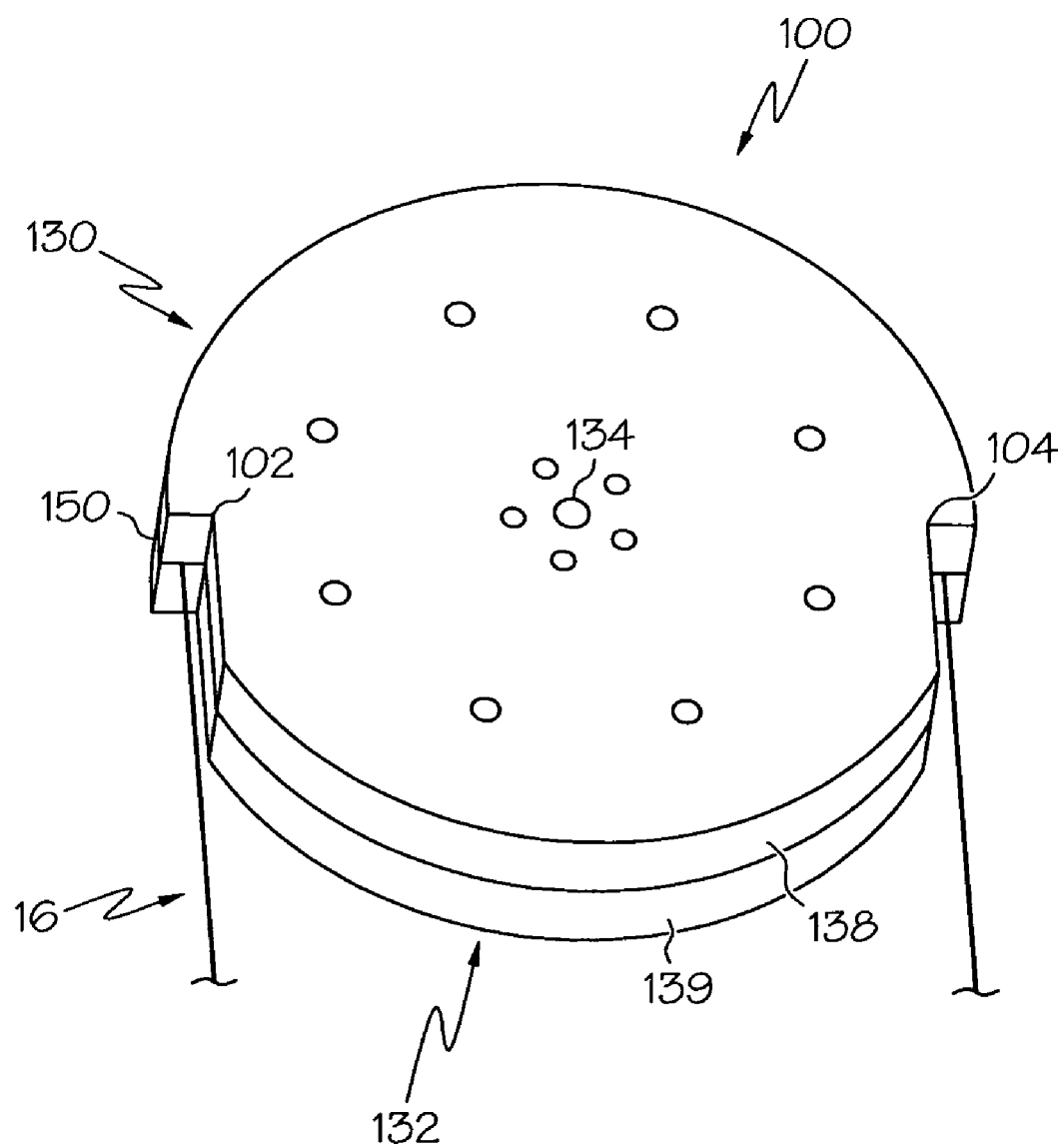
FIG. 2 is a schematic diagram showing a fluid bearing according to one or more embodiments shown and described herein.
Figure 3:
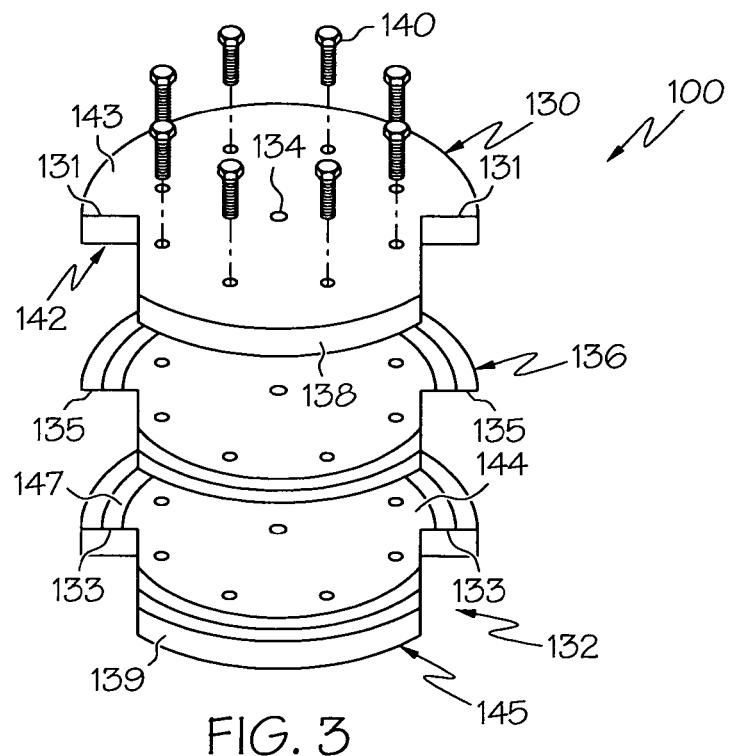
FIG. 3 is an exploded view of a fluid bearing for use in an optical fiber production system according to one or more embodiments shown and described herein.

The methods described herein relate to the manufacture of optical fibers and, more specifically, to non-contact methods for measuring the tension applied to an optical fiber during a fiber drawing process. The method, schematically shown in FIGS. 1A and 1B, may comprise applying a pressurized fluid to the optical fiber to displace the optical fiber. The position of the optical fiber resulting from the application of the applied pressurized fluid is then used to determine the tension applied to the optical fiber based on a predetermined relationship between displacement and applied draw tensions for a particular pressure and/or a particular flow rate of applied pressurized fluid. FIGS. 2 and 3 illustrate one embodiment of a fluid bearing which may be used in conjunction with the methods described herein to measure the tension of an optical fiber during the fiber drawing process. The fluid bearing may generally comprise a fiber support channel. The fluid bearing may also contain notched portions such that the position of an optical fiber disposed in the fiber support channel may be determined. The optical fiber may be supported in the fiber support channel by pressurized fluid supplied to the fiber support channel. The position of the optical fiber in the fiber support channel may vary according to the tension applied to the optical fiber and the pressure and/or flow rate of the pressurized fluid P supplied to the fiber support channel. For a particular pressure and/or flow rate, the draw tension applied to the optical fiber may be determined based on the position of the fiber in the fiber support channel. Each of the elements of the fluid bearing and the method of measuring the tension of the optical fiber will be described in more detail herein.

Figure 1A:
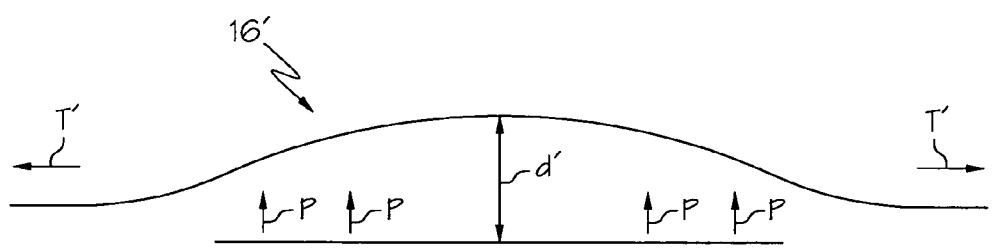
FIGS. 1A and 1B are schematic diagrams illustrating one method of measuring the tension applied to an optical fiber according to one or more embodiments shown and described herein.

Referring to FIG. 1(a), a schematic diagram of one embodiment of the method for measuring the tension of a drawn fiber is shown. A fiber, such as an optical fiber 16', may be drawn at a tension T' along a horizontally oriented, substantially linear pathway. A pressurized fluid P, such as a compressed gas or liquid, may be applied to the optical fiber 16' causing the optical fiber to be displaced by a distance d' relative to a fixed point, such as a surface, a fiducial mark or the like. In one embodiment, the pressurized fluid P may be applied to the optical fiber by one or more jets (not shown) which direct the pressurized fluid P towards the optical fiber. In another embodiment, the pressurized fluid P may be applied to the optical fiber at a known pressure or flow rate. In some preferred embodiments, the pressure and/or flow rate is a constant pressure and/or a constant flow rate. The distance d' which the fiber is displaced may be related to the diameter of the fiber, the composition of the fiber, the tension T' applied to the fiber, and the pressure and/or flow rate of the pressurized fluid P which is applied to the fiber. For an optical fiber of a given diameter and composition (and thus the density of the fiber), the distance which the optical fiber 16' is displaced by a pressurized fluid P applied at a particular pressure and/or a particular flow rate may be calibrated based on the draw tension T' applied to the optical fiber 16'.

Figure 1B:
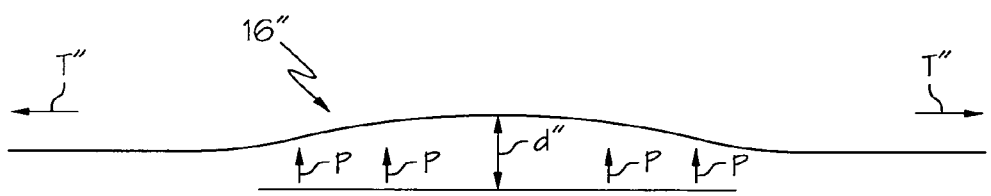

Referring now to FIGS. 1(a) and 1(b) by way of example, an optical fiber 16' may be drawn at a tension T' of, for example, 20 grams. The application of the pressurized fluid results in the optical fiber 16' being displaced by a distance d'. A second optical fiber 16" having the same diameter and composition as the optical fiber 16' may be drawn at a second draw tension T" greater than the draw tension T'. For example, the second draw tension T" may be 200 grams. Pressurized fluid P applied to the second optical fiber 16" at the same pressure and/or flow rate as applied to the optical fiber 16' results in the second optical fiber 16" being displaced by a distance d". As shown in FIGS. 1(a) and 1(b), the displacement d" of the second optical fiber 16" is less than the displacement d' of the optical fiber 16' when the pressurized fluid is applied to both optical fibers 16', 16" at the same pressure and flow rate. The difference in the displacements d', d" of the optical fibers 16', 16" is due to the different draw tensions T', T" applied to each of the optical fibers 16', 16". More specifically, for a given optical fiber and pressure and/or flow rate of applied pressurized fluid, greater draw tensions result in less displacement of the optical fiber.

Accordingly, for optical fibers having the same diameters and compositions, the displacement of the optical fiber as a result of a pressurized fluid being applied to the optical fiber may be calibrated based on the draw tension applied to the optical fiber. For example, to calibrate the displacement distance of an optical fiber based on the draw tension, a series of displacement measurements may be taken for a range of known draw tensions as a pressurized fluid is applied to the optical fiber at a particular pressure and/or a particular flow rate. In one embodiment, the draw tension, displacement distance, pressure and/or flow rate of the applied pressurized fluid may then be used to create a table relating the draw tension to the displacement distance at a particular applied pressure and/or a particular flow rate of the pressurized fluid. In another embodiment, the displacement distance of the optical fiber may be plotted as a function of known draw tensions to form a calibration curve. The relationship between the draw tension and the displacement may then be determined mathematically and used to calculate draw tension based on measured displacements of the optical fiber. Irrespective of the technique used to establish the calibration between the draw tension and the displacement of the optical fiber, thereafter, the calibration may be used to determine the draw tension applied to the optical fiber based on the measured displacement of the optical fiber due to the application of pressurized fluid to the optical fiber.

As shown in FIGS. 1(a) and 1(b), the method of determining the draw tension applied to an optical fiber may be performed on an optical fiber drawn along a horizontally oriented, substantially linear pathway by measuring the displacement of the optical fiber as a result of the application of a pressurized fluid applied to the optical fiber. It should now be understood that the methods of determining the draw tension of an optical fiber may be utilized to determine the draw tension of an optical fiber drawn along substantially linear pathways oriented vertically or at any angle between horizontal and vertical. Moreover, as will be discussed further herein, the methods described herein may also be used to measure the draw tension of optical fibers drawn along non-linear pathways.

Referring now to FIGS. 2-6, an apparatus, specifically a fluid bearing 100, for use in conjunction with the methods of determining the draw tension of an optical fiber is shown. The fluid bearing 100 facilitates the measurement of the draw tension applied to an optical fiber as the optical fiber is drawn along a substantially non-linear pathway. In addition, the fluid bearing 100 may be used to redirect an optical fiber from a first pathway to any second pathway and to cool the optical fiber after the optical fiber exits a draw furnace.

In the embodiment illustrated, the fluid bearing 100 may generally comprise a first plate 130, a second plate 132, an inner member 136 and at least one opening 134 in at least one of the first and second plates. The first plate 130 and the second plate 132 may be made of metal and include arcuate outer edges 138, 139. The first plate 130 and second plate 132 may be positioned opposite one another. The first plate 130, the second plate 132, and the inner member 136 may comprise notched portions 131, 133 and 135, respectively, such that, when assembled, the fluid bearing 100 has corresponding notched portions 102, 104. The notched portions 102, 104 are positioned and configured such that the position of an optical fiber 16 disposed in the fiber support channel 150 may be determined relative to the fiber support channel 150 and/or notched portion 102, 104 of the fluid bearing 100. The first plate 130 and the second plate 132 are connected by fasteners (e.g., bolts 140) to link the plates 130, 132 together so that fluid may be passed through the fluid bearing 100. The arcuate outer edges 138, 139 of each plate 130, 132 may generally lie along the perimeter of each of the respective plates 130, 132. The first plate 130 and the second plate 132 each have respective inner 142, 144 and outer surfaces 143, 145, wherein the inner surfaces 142, 144 of the plates 130, 132 are aligned with each other. A recessed portion 147 may extend at least partially around the inner faces 142, 144 of either of the first plate 130 or the second plate 132 to provide a plenum for fluid flow.

While FIGS. 2 and 3 depict two notched portions 102, 104 in the fluid bearing 100, it should be understood that the fluid bearing 100 may comprise any number of notched portions such that the position of an optical fiber 16 positioned in the fiber support channel 150 may be determined. Moreover, it should be understood that the notched portions 102, 104 may be substantially parallel to one another, as depicted in FIGS. 2 and 3, or that the notched portions may be non-parallel with one another. For example, referring to FIG. 8, a fluid bearing 110 is shown which comprises notched portions orientated substantially perpendicular to one another. Accordingly, when the fluid bearing 100 contains two or more notched portions, it will be understood that the notched portions may be oriented at any angle with respect to one another.

Figure 4:
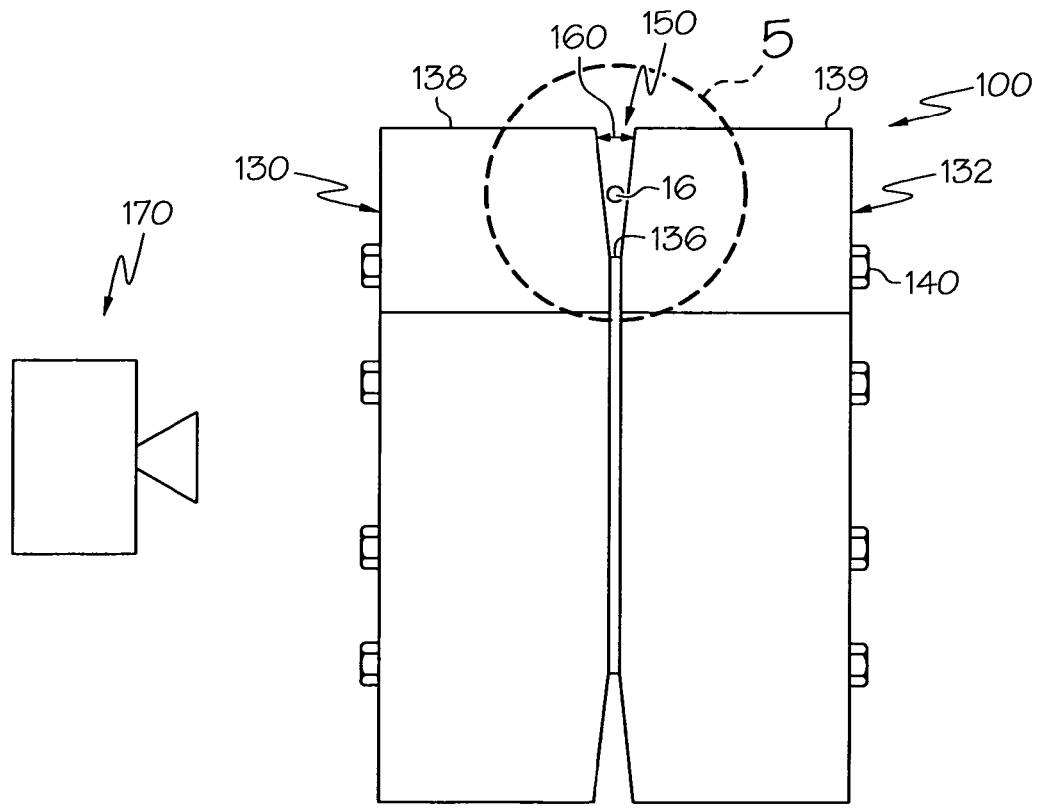
FIG. 4 is a side plan view of the fluid bearing of FIG. 2 for use in an optical fiber production system according to one or more embodiments shown and described herein.
Figure 5:
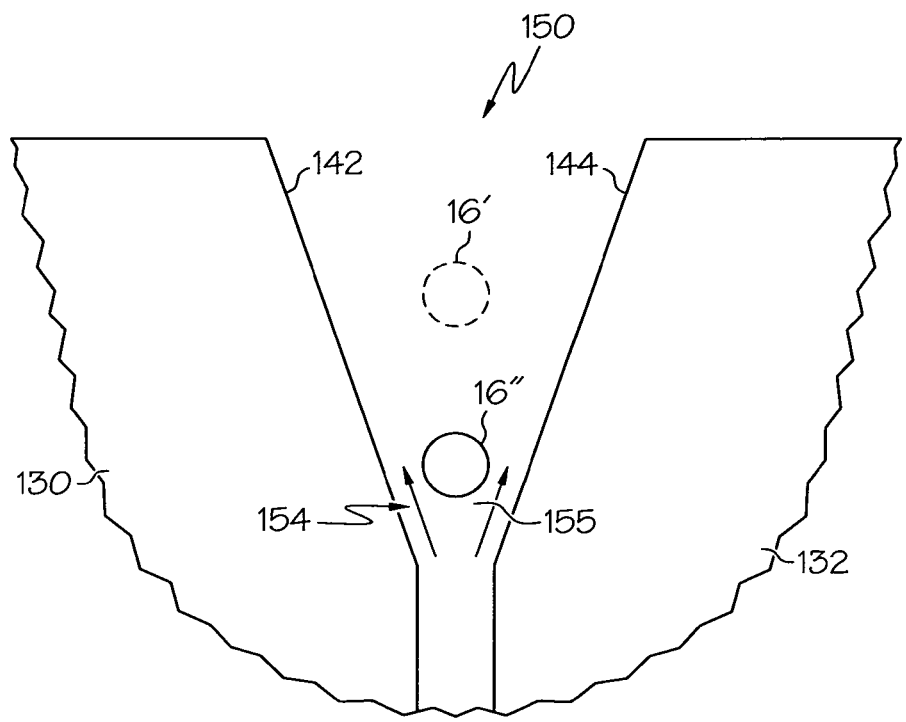
FIG. 5 is an enlarged view of the fiber support channel of the fluid bearing of FIG. 3 according to one embodiment shown and described herein.

Referring again to FIGS. 2-6, the arcuate outer edges 138, 139 of the first plate 130 and the second plate 132 may be substantially aligned such that the inner surface 142 of the first plate 130 and the inner surface 144 of the second plate 132 form the sidewalls of a fiber support channel 150 positioned between the outer arcuate edges 138, 139 of both the first plate 130 and the second plate 132. The inner surface 142 of the first plate 130 and the inner surface 144 of the second plate 132 (shown in FIG. 5 as sidewalls 142, 144 of the fiber support channel 150) may be shaped such that the fiber support channel 150 is tapered, as shown in FIGS. 4 and 5. The wider portion of the fiber support channel 150 may be configured to receive an optical fiber 16 so that the optical fiber 16 can travel along the fiber support channel 150 without rotation of the fluid bearing 100. At least one opening 134 passes through at least one of the first plate 130 and the second plate 132. The opening 134 in the first plate 130 permits fluid (e.g., air, helium or other gas or liquid) to be fed through the fluid bearing 100 and into the narrower end of the fiber support channel 150. The fluid exits the fluid bearing 100 at the wider end of the fiber support channel 150.

The fluid bearing 100 may include an inner member 136 positioned between the first plate 130 and the second plate 132. This inner member 136 may be configured to aid in directing the fluid to the fiber support channel between the outer arcuate edges 138, 139 of the first plate 130 and the second plate 132 such that the fluid exits the fiber support channel 150 having a predetermined flow direction. The inner member 136 rests between the first plate 130 and the second plate 132 to provide a gap therebetween. In addition, the inner member 136 may serve as a sealing portion to provide a substantial contact between the first plate 130 and the second plate 132.

The spacing between the optical fiber 16 and the fiber support channel 150 may vary depending on where the optical fiber 16 is vertically positioned in the fiber support channel 150. Preferably, the tapered fiber support channel 150 is configured so that, for particular draw tensions, draw speeds and pressures and/or flow rates of the pressurized fluid through the fiber support channel 150, the optical fiber 16 is maintained in a region of the fiber support channel 150 which is less than 500 µm wide, more preferably less than 400 µm wide, even more preferably less than 300 µm wide, for an optical fiber having a typical outer diameter of 150 µm.

Referring now to FIG. 5, an enlarged view of a portion of FIG. 4 is shown to better illustrate the functionality of the fluid bearing 100. FIG. 5 shows the relative positioning of two optical fibers 16', 16" subject to different draw tensions T', T". Specifically, the first optical fiber 16' is subject to a draw tension T' while the second optical fiber 16" is subject to a draw tension T" where T" is greater than T'. It should be understood that, while the fiber support channel 150 depicted in FIG. 5 shows two optical fibers 16', 16" positioned in the fiber support channel 150, the simultaneous positioning of two optical fibers in the fiber support channel 150 is for illustrative and comparative purposes only, and that, in practice, only one fiber is generally positioned in the fiber support channel 150 at any time. Referring specifically to the optical fiber 16" positioned in the fiber support channel 150, FIG. 5 depicts the optical fiber 16" supported in the fiber support channel 150 by pressurized fluid 154 supplied to the fiber support channel 150 at a particular pressure and/or flow rate as the optical fiber 16" is drawn through the fluid bearing 100. In one embodiment, the pressurized fluid may be provided to the fiber support channel 150 at a constant pressure and/or constant flow rate. The pressurized fluid 154 creates a fluid cushion which prevents the optical fiber 16" from mechanically contacting the components of the fluid bearing 100. As depicted in FIG. 5, fluid 154 (e.g. air) may exit the fiber support channel 150 from within the fluid bearing 100 and around the optical fiber 16" thereby providing the region of fluid cushion which the optical fiber 16" contacts. For a given draw tension or range of draw tensions the fluid pressure and/or the flow rate of the fluid may be optimized such that the fiber 16" is positioned within the fiber support channel 150 formed between the first plate 130 and the second plate 132 of the fluid bearing 100. Particularly, the fluid 154 acting on the optical fiber 16" may be in equilibrium with the draw tension applied to the optical fiber 16" such that the optical fiber 16" is maintained and/or supported at a certain position within the fiber support channel 150 for a given draw tension. The hydrostatic pressure creates a region of fluid cushion beneath the optical fiber 16" as a result of the pressure differential between the fiber and the plates 130, 132. A high enough fluid pressure may be provided to the fiber support channel 150 to support the optical fiber 16" and maintain the optical fiber 16" at a desired location within the fiber support channel 150 as the optical fiber 16" is drawn through the fluid bearing assembly 100 at a given draw tension. Accordingly, the fluid bearing 100 facilitates and/or enables redirection of the optical fiber 16" along a different path without mechanically contacting the optical fiber 16".

As discussed hereinabove, FIG. 5 depicts two optical fibers 16', 16" positioned in the fiber support channel 150 for purposes of illustration and comparison. Specifically, the first optical fiber 16' is subject to a draw tension T' while the second optical fiber 16" is subject to a draw tension T" where T" is greater than T'. The first optical fiber 16' is positioned closer to the wider portion of the fiber support channel 150 while the second optical fiber 16" is positioned closer to the narrower portion of the fiber support channel 150. The optical fibers 16', 16" are identical in composition and diameter and are subject to the same pressure and/or flow rate of applied pressurized fluid 154 supplied to the narrower portion of the fiber support channel 150. As discussed herein with respect to FIG. 1, the difference in the position of the optical fibers 16', 16" in the fiber support channel 150 may be attributed to different tensions applied to the optical fibers. For example, the first optical fiber 16' may be subject to an applied draw tension T' of 20 grams while the second optical fiber 16" may be subject to an applied draw tension T" of 200 grams. Thus, for the same pressure and/or flow rate of pressurized fluid applied to the optical fibers 16', 16", the optical fiber subject to the lower applied draw tension T' is subject to greater displacement relative to the fiber support channel 150. As such, the more tension that is applied to an optical fiber disposed in the fiber support channel, the closer the optical fiber is positioned to the narrower portion of the fiber support channel.

Figure 6:
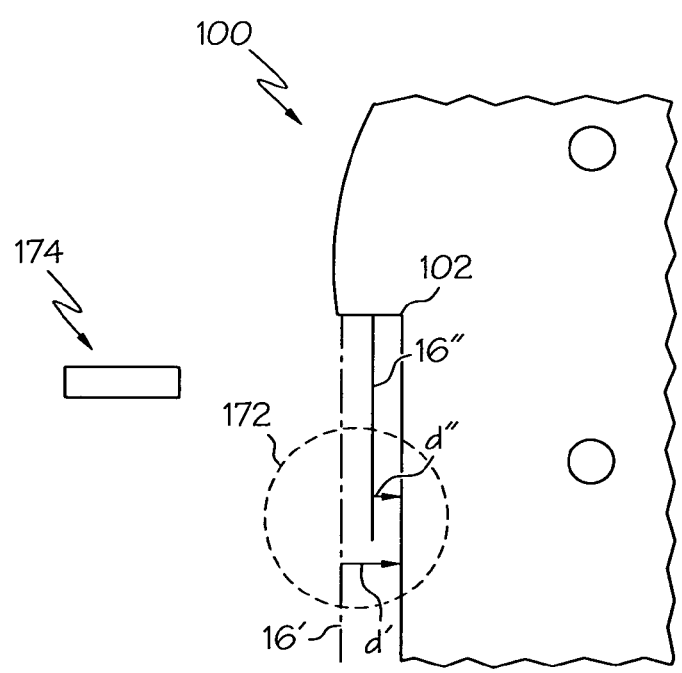
FIG. 6 is an enlarged view of a notched portion of the fluid bearing showing the relative position of optical fibers subject to different draw tensions.

FIG. 6 depicts a close up view of a first optical fiber 16' subject to an applied draw tension T' and a second optical fiber 16" subject to an applied draw tension of T", as shown in FIG. 5. FIG. 6 shows the optical fibers 16', 16" entering or exiting the fiber support channel 150 in a notched portion 102 of the fluid bearing 100. As shown in FIG. 6, the displacement of the optical fibers 16', 16" due to the applied pressurized fluid may be measured in the notched portion 102. The displacement of the optical fibers in the notched portion 102 may be indicative of the position of the optical fibers in the fiber support channel 150 as shown in FIG. 5. In one embodiment, the displacement and/or position of the optical fibers may be measured using a non-contact displacement sensor such as a laser micrometer 174 or a similar measurement device positioned proximate the notched portion 102 as shown in FIG. 6. In another embodiment, an imaging device 170, such as a camera, may be used to measure the displacement and/or position of the optical fibers as shown in FIG. 4. The imaging device 170 may be focused on an area 172 (see FIG. 6) proximate the notched portion 102 such that the position or displacement of the optical fibers relative to the notched portion 102 may be determined from a captured image of the area 172.

As discussed hereinabove with respect to FIG. 1, for optical fiber of a given diameter and composition subject to an applied pressurized fluid of a particular pressure and/or a particular flow rate, a relationship may be determined between the drawn tension applied to the optical fiber and the resulting displacement of the optical fiber such that the displacement of the optical fiber may be calibrated based on the applied draw tension. For example, the relationship may be determined by measuring the displacement and/or position of an optical fiber in the fiber support channel of a fluid bearing for a range of known draw tensions applied to the optical fiber while a pressurized fluid is supplied to the fiber support channel. The relationship between the applied draw tension and displacement and/or position of the optical fiber may then be used to calibrate the fluid bearing for an optical fiber having a given diameter and composition subject to a particular pressure and/or a particular flow rate of pressurized fluid.

Once the relationship between the position of the optical fiber in fiber support channel and the applied draw tension has been determined, the fluid bearing 100 may be used to determine the draw tension applied to an optical fiber 16" during the optical fiber drawing process by measuring the position of the optical fiber in the fiber support channel 150 of the fluid bearing. The process of determining the applied draw tension based on the measured position of the optical fiber will now be described with reference to FIGS. 2-7.

The optical fiber 16" is first routed into the fluid bearing 100 such that the optical fiber 16" is disposed in the fiber support channel 150. The optical fiber 16" is displaced relative to the fiber support channel 150 by pressurized fluid 154 supplied to the fiber support channel 150. Once equilibrium has been reached between the tension applied to the optical fiber 16" and the pressurized fluid, the optical fiber 16" is supported in the fiber support channel 150 on a fluid cushion.

The position of the optical fiber 16" in the fiber support channel 150 may then be determined by measuring the displacement or position of the optical fiber 16" in a notched portion 102, 104 of the fluid bearing 100. For example, in one embodiment, the position or displacement of the optical fiber may be measured using a laser micrometer 174 or similar measurement device positioned proximate a notched portion 102, 104 of the fluid bearing. Examples of alternative apparatus that could be used to measure the position or displacement of the optical fiber to assist in determining fiber tension include the Series CV-2100 Vision system available from Keyence Corporation, Osaka, Japan, the DVT Visions System, which is available from Cognex Corporation, having offices in Natick, Mass., USA, the LS-5000 laser micrometer or LS 7000 LED/CCD optical micrometer systems, either or both of which are available from Keyence Corporation, Osaka, Japan; the LT Series laser confocal displacement meter, which is also available from Keyence Corporation, Osaka, Japan; and the LC Laser displacement sensor, which is also available from Keyence Corporation, Osaka, Japan.

In another embodiment, the position or displacement of the optical fiber 16" in the notched portion 102 of the fluid bearing 100 may be measured using an imaging device 170 to capture an image of the optical fiber 16" in an area 172 proximate the notched portion 102 of the fluid bearing 100. The actual position of the optical fiber 16" may then be determined from the captured image. Regardless of the technique used, the measured position of the optical fiber is indicative of the position of the optical fiber 16" in the fiber support channel 150 of the fluid bearing.

After the position of the optical fiber 16" in the fiber support channel 150 is determined, the draw tension applied to the optical fiber 16" may be determined based on the determined position of the optical fiber 16" and the previously established relationship between the position of the optical fiber 16" in the fiber support channel 150 and the applied draw tension for a particular pressure and/or a particular flow rate of the applied pressurized fluid.

Figure 7:
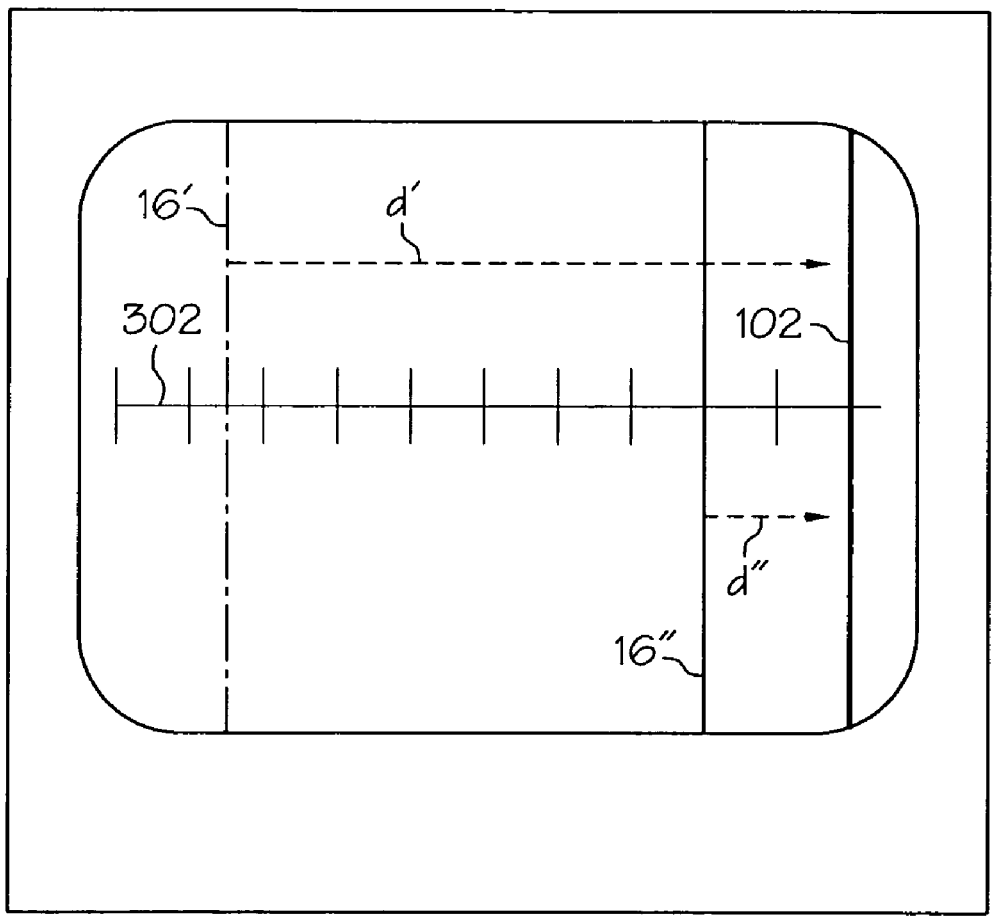
FIG. 7 is schematic view of a video monitor overlayed with a calibrated scale which may be used to determined the draw tension applied to an optical fiber based on the position of the optical fiber relative to a fluid bearing according to one embodiment shown and described herein.
Figure 7:

In one embodiment, when the position of the optical fiber 16" is determined by capturing an image of the optical fiber 16" in the notched portion 102 of the fluid bearing 100, the draw tension applied to the optical fiber 16" may be determined using a calibrated scale 302 as shown in FIG. 7. The calibrated scale 302 may be created based on the previously determined relationship between the position of the optical fiber 16" in the fluid support channel and applied draw tension. The graduations on the calibrated scale 302 may be indicative of the draw tension applied to the optical fiber for a specific pressure and/or flow rate of pressurized fluid applied to the fiber. The calibrated scale 302 may be positioned over the captured image of the optical fiber 16" in the notched portion 102 of the fluid bearing 100 and, based on the position of the optical fiber 16" on the calibrated scale 302, the applied draw tension may be determined. In one embodiment, the notched portion 102 of the fluid bearing may be used as a fiducial mark to correctly position the calibrated scale 302 on the captured image. In another embodiment, the calibrated scale 302 may be positioned on a video monitor 300 or similar device displaying the captured image of the optical fiber 16". In another embodiment, the captured image of the optical fiber 16" may be a still image and the calibrated scale 302 is placed over the still image to determine the position of the optical fiber 16" on the calibrated scale 302 and, therefore, the draw tension applied to the optical fiber 16".

In another embodiment, when the position of the optical fiber 16" is determined by capturing an image of the optical fiber 16" in the notched portion 102 of the fluid bearing 100, the draw tension applied to the optical fiber 16" may be determined by performing image analysis on the captured image. For example, image analysis software may be calibrated using the previously established relationship between the draw tension of the applied optical fiber and the position or displacement of the optical fiber 16" in the fluid support channel 150 of the fluid bearing 100. The calibrated image analysis software may then be used to determine the draw tension applied to the optical fiber 16" based on the captured image of the optical fiber.

Alternatively, the measured position or displacement of the optical fiber 16" in the fiber support channel 150 may be used to calculate the draw tension applied to the optical fiber 16" based on a predetermined relationship between tension applied to the optical fiber 16" and the position or displacement of the optical fiber 16" in the fiber support channel. For example, a mathematical relationship between the position or displacement of the optical fiber 16" and the applied draw tension may be determined from a calibration curve relating the two quantities. This mathematical relationship may then be used to calculate an applied draw tension based on the measured position or displacement of the optical fiber 16". Alternatively, the measured position or displacement of the optical fiber 16" may be used in conjunction with the calibration curve to determine the draw tension applied to the optical fiber.

In another embodiment, the draw tension applied to the optical fiber 16" may be determined by comparing the measured position or displacement of the optical fiber 16" to a table of applied draw tensions indexed according to the measured position or displacement of the optical fiber 16". In one embodiment, the table may be further indexed according to the pressure and/or flow rate of the pressurized fluid applied to displace the optical fiber, the diameter of the optical fiber, and/or the composition of the optical fiber.

It should now be understood that a variety of different techniques may be used to determine the draw tension applied to the optical fiber using the determined position of the optical fiber in the fiber support channel in conjunction with a previously established relationship between applied draw tensions and the position of the optical fiber in the fiber support channel for particular pressures and/or flow rates of the applied pressurized fluid. Unless otherwise stated, no particular limitation is intended as to the particular method of using the determined position of the optical fiber to determine the draw tension applied to the optical fiber.

Figure 8:
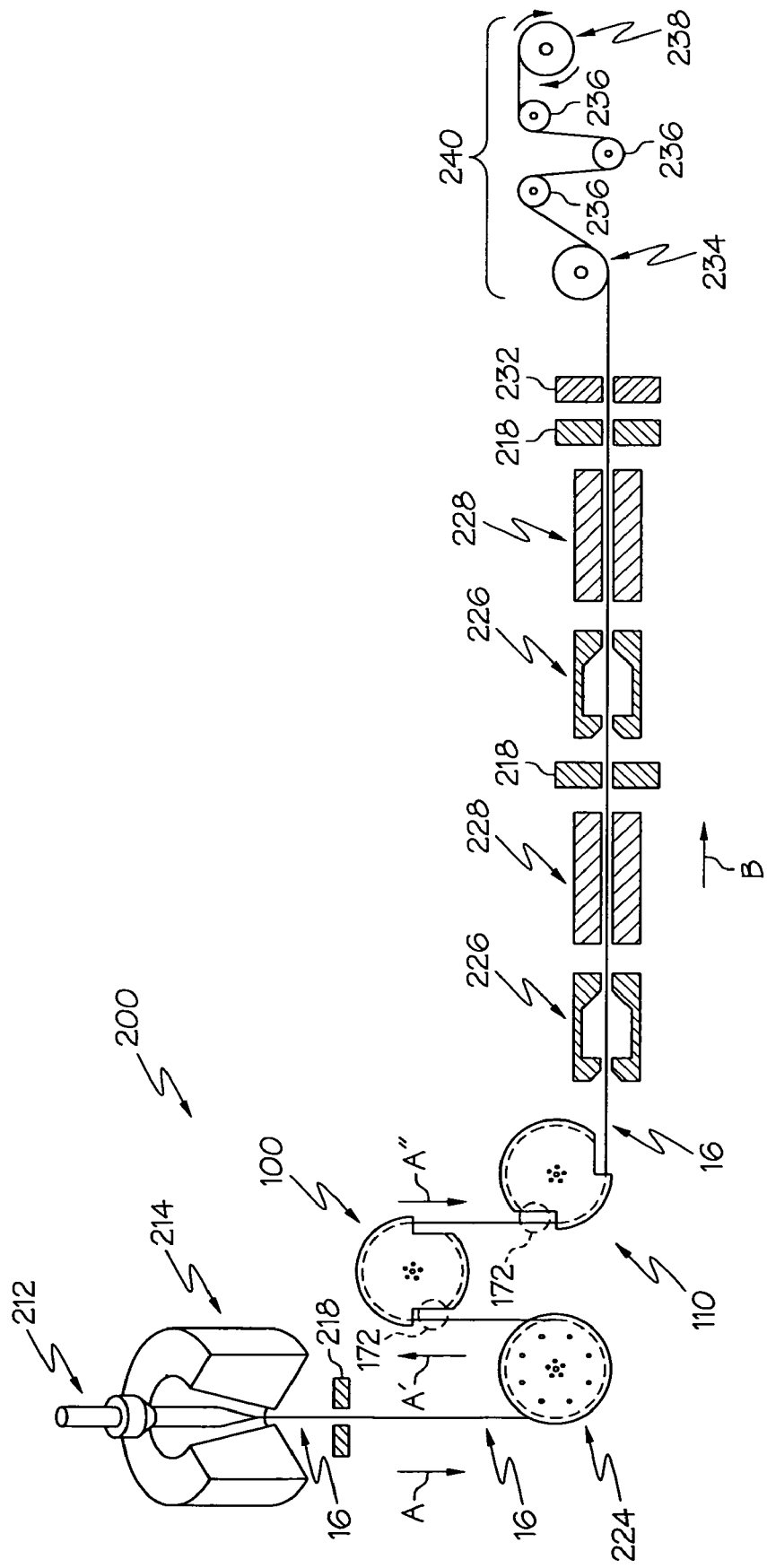
FIG. 8 is a schematic illustration of an optical fiber production system according to one or more embodiments shown and described herein.

Referring now to FIG. 8, one embodiment of a system 200 for drawing optical fiber is illustrated which incorporates fluid bearings 100, 110 that may be used in conjunction with the methods for measuring the draw tension of an optical fiber as described herein. The system 200 may comprise a draw furnace 214 for heating an optical fiber preform 212 such that an optical fiber 16 may be drawn from the optical fiber preform 212. The preform 212 may comprise glass or any material suitable for the manufacture of optical fibers. The draw furnace 214 may be oriented along a first pathway A such that an optical fiber 16 drawn from the optical fiber preform 212 exits the furnace along the first pathway A. In the embodiments shown and described herein, the first pathway A is a substantially vertical pathway. A fiber take-up mechanism 240 comprising a plurality of fiber tensioning mechanisms 236 and a fiber storage spool 238 is used to apply and maintain the tension on the optical fiber 16 as it is drawn through the various stages of the system 200.

After the optical fiber 16 exits the draw furnace, the diameter of the optical fiber may be measured by one or more non-contact sensors 18 positioned along the first pathway A. The optical fiber may then be redirected from the first pathway A to a second pathway B where the optical fiber is subjected to additional manufacturing processes including, without limitation, the application of coatings (e.g., the optical fiber is passed through coating die(s) 226), the curing of applied coatings (e.g., the optical fiber is passed through irradiator(s) 228), and the like. The diameter of the optical fiber may also be measured by non-contact sensors 218 positioned along pathway B and the optical fiber may be checked for flaws using a flaw detector 232. Additional processing steps (not shown) may also be performed on the optical fiber along pathway B prior to the optical fiber being wound onto a storage spool 238. It should be understood that pathway B may be either parallel or nonparallel with the first pathway A. For example, in one embodiment shown in FIG. 8, pathway B may be substantially perpendicular to the first pathway A while intermediate pathways A' and A" are substantially parallel to the first pathway A, as depicted in FIG. 8. However, it will be understood that pathways A', A" and B may have any orientation with respect to the first pathway A. Further, it will be understood that the optical fiber 16 may be directed along any number of differently oriented intermediate pathways between the first pathway A and pathway B as depicted in FIG. 8.

To facilitate redirecting the fiber from the first pathway A to the second pathway B without damaging the optical fiber as a result of mechanical contact, the system 200 may comprise one or more fluid bearings, such as fluid bearings 100, 110 and 224, to redirect the optical fiber along various pathways while supporting the fiber with an applied pressurized fluid. As indicated in FIG. 8, the system may include fluid bearings 100, 110 comprising notches in accordance with one aspect of the present invention. In addition to redirecting the optical fiber from the first pathway A to the second pathway B, these fluid bearings 100, 110 may also be used to facilitate the measurement of draw tension applied to the optical fiber during the draw process. For example, the system 200 may also include a laser micrometer (not shown) and/or an imaging device (not shown) which may be used to determine the position of the fiber in the fiber support channel relative to the notched portion of the fluid bearing as a result of the applied pressurized fluid used to support the fiber in the fluid bearing. The determined position of the optical fiber can then be used to determine the tension of the optical fiber, as discussed hereinabove, using the established relationship between the position of the fiber in the fiber support channel and the applied tension for a particular fluid pressure and/or a particular flow rate.

Specific embodiments discussed herein make reference to the use of a fluid bearing to redirect an optical fiber from a first pathway to any second pathway. However, it should be understood that the fluid bearing, as used in conjunction with the methods for measuring the draw tension of the optical fiber described herein, need not redirect the optical fiber from the first pathway. Accordingly, the optical fiber may enter and exit the fluid bearing along a first pathway or the optical fiber may enter the fluid bearing along a first pathway and exit the fluid bearing along a second pathway.

It should be understood that the methods of measuring the draw tension applied to an optical fiber described herein may be used in conjunction with the optical fiber drawing system 200 to modify various parameters of the optical fiber drawing system which, in turn, effects the properties of the resulting optical fiber such as the diameter of the optical fiber, the thickness of coatings applied to the optical fiber and the like. For example, the diameter of the optical fiber may be effected by the temperature of the draw furnace, the temperature of the optical fiber as it is drawn through the optical fiber drawing system, the tension applied to the optical fiber, and the speed at which the optical fiber is drawn through the optical fiber system. If the temperature of the draw furnace and/or the temperature of the optical fiber drawn from the draw furnace is too high, the glass comprising the optical fiber becomes more viscous and the diameter of the resulting optical fiber is decreased for a given draw tension or draw speed. Conversely, if the temperature of the draw furnace is too low, the glass comprising the optical fiber becomes less viscous and the diameter of the resulting optical fiber is increased for a given draw tension and/or draw speed. To produce an optical fiber having a uniform diameter, the tension applied to the optical fiber may be measured and the results of those measurements, in conjunction with measurements of the diameter of the optical fiber, may be used to adjust the temperature of the draw furnace, the tension applied to the optical fiber by a tensioning mechanism, and/or the speed of the fiber take-up mechanism. Similarly, the pressure and/or flow rate of the pressurized fluid applied to the optical fiber in the fluid bearing may also be adjusted to control the position of the optical fiber in the fiber support channel based on the applied draw tension.

Accordingly, in one embodiment, the methods of measuring the tension applied to an optical fiber described herein may be used in conjunction with a control system of a fiber drawing system to facilitate closed-loop feed back control of a system for drawing optical fiber. The use of such methods may be particularly important at the start-up of a fiber drawing process as various process parameters are adjusted in order to arrive at an optical fiber having the desired properties. Further, the methods for measuring the tension applied to the optical fiber may also be useful throughout the entire optical fiber drawing process to measure the tension applied to the optical fiber and adjust process parameters accordingly to insure uniformity in the resulting optical fiber. For example, closed loop computerized control systems could be employed wherein the tension is monitored simultaneous with the fiber being drawn from an optical fiber preform, and adjustments are made to the fiber draw control parameters keep the fiber tension at a desired amount.

The methods and techniques described herein provide for the non-contact measurement of the draw tension applied to an optical fiber and offer significant advantage over existing measurement techniques. For example, the use of a fluid bearing reduces vibration in the optical fiber and thereby mitigates or eliminates acoustic noise from the draw system which may adversely impact tension measurements. Moreover, the methods and techniques described herein require minimal calibration. For example, the fluid bearing used to facilitate the draw tension measurement need only be calibrated once for each diameter of optical fiber and the corresponding fluid pressure and/or flow rate of fluid applied to the optical fiber in the fluid bearing. Thereafter, for a given pressure and/or flow rate of pressurized fluid, the tension applied to the optical fiber can be accurately determined based on the measured displacement.

It should now be understood that the methods and systems described herein provide for the non-contact measurement of the draw tension applied to an optical fiber during the manufacture of the optical fiber. It should also be understood that the methods and techniques described herein may be used in conjunction with any process or operation in which it is necessary to measure the tension applied to an optical fiber, such as when the optical fiber is coiled onto a spool or uncoiled from a spool. Further, while specific reference has been made to the use of the methods and apparatus described herein for the measurement of the draw tension applied to an optical fiber, such as a glass optical fiber, it should be understood that the methods and apparatus described herein may also be used to measure the draw tension applied to any type of fiber including, without limitation, carbon fibers, synthetic fibers, natural fibers, and the like.

It will be apparent to those skilled in the art that various modifications and variations may be made to the present invention without departing from the spirit and scope of the invention. Thus it is intended that the present invention cover the modifications and variations of this invention provided they come within the scope of the appended claims and their equivalents.

What is claimed is:

1. A non-contact method of measuring the tension applied to an optical fiber, the method comprising:
    applying a pressurized fluid to the optical fiber to displace the optical fiber;
    the pressurized fluid is applied to the optical fiber by contacting the optical fiber with a fluid cushion in a fluid bearing, the fluid bearing comprising a optical fiber support channel defined by at least two sidewalls wherein the optical fiber is retained within a region a the fiber support channel which is sufficient to cause the optical fiber to be supported within the fiber support channel substantially as a result of a pressure differential which is present below the optical fiber within the fiber support channel;
    determining a displacement of the optical fiber caused by the applied pressurized fluid; and
    determining a tension applied to the optical fiber based on the determined displacement and flow rate and/or pressure of the pressurized fluid.

2. The method of claim 1, wherein the pressurized fluid is supplied to the fiber support channel at a constant flow rate and/or a constant pressure.

3. The method of claim 1 wherein the fiber support channel is tapered such that the fiber support channel comprises a wider portion and a narrower portion, wherein the wider portion is configured to receive an optical fiber and the narrower portion is configured to receive the pressurized fluid and, for a given pressure and/or flow rate of pressurized fluid supplied to the fiber support channel, an optical fiber subject to relatively low tension is positioned closer to the wider portion of the fiber support channel while an optical fiber subject to relatively high tension is positioned closer to the narrower portion of the fiber support channel.

4. The method of claim 1 wherein the displacement of the optical fiber is determined using a laser micrometer, a non-contact displacement sensor, an imaging device, or a combination thereof.

5. The method of claim 1 further comprising, prior to said applying pressurized fluid step, drawing said optical fiber from an optical fiber perform, and wherein said determining a tension step occurs simultaneous to said drawing a fiber step.

6. A method of claim 5, further comprising:
    adjusting at least one process parameter in said drawing said optical fiber step.

7. The method of claim 6 wherein the process parameter comprises at least one of an operating temperature of a draw furnace, a speed of a fiber take-up mechanism, a draw tension applied to the optical fiber by a fiber tensioning mechanism, and/or the pressure or flow rate of the pressurized fluid supplied to the fluid bearing.

8. The method of claim 1 wherein the tension of the optical fiber is determined by comparing the determined displacement of the optical fiber to a table of known fiber tensions indexed according to measured fiber displacements corresponding to specific pressures and/or flow rates of the pressurized fluid.

9. The method of claim 1 wherein the displacement of the optical fiber is measured by capturing an image of the displaced optical fiber and wherein the tension applied to the optical fiber is determined by overlaying the captured image of the displaced optical fiber with a calibrated scale wherein the position of the optical fiber on the calibrated scale is indicative of the tension applied to the optical fiber.

10. The method of claim 1 wherein the displacement of the optical fiber is determined by capturing an image of the displaced optical fiber and the tension applied to the optical fiber is determined by performing image analysis on the captured image of the displaced optical fiber using image analysis software calibrated using optical fiber displacement measurements for various combinations of known applied tensions and pressures and/or flow rates of the pressurized fluid.

11. A non-contact method for measuring a draw tension applied to an optical fiber in an optical fiber drawing process, the method comprising:
drawing an optical fiber from an optical fiber preform;
routing the optical fiber into a fluid bearing comprising a fiber support channel wherein the optical fiber is supported in the fiber support channel on a fluid cushion created by supplying pressurized fluid to the fiber support channel; and
determining a position of the optical fiber in the fiber support channel; and
determining a draw tension applied to the optical fiber based on the determined position of the optical fiber in the fiber support channel and flow rate or pressure of the pressurized fluid or combinations thereof.

12. The method of claim 11 wherein the support channel comprises at least one notched portion to facilitate determining the position of the optical fiber in the fiber support channel.

13. The method of claim 11 wherein the fiber support channel is tapered such that the fiber support channel comprises a wider portion and a narrower portion, wherein the wider portion is configured to receive an optical fiber and the narrower portion is configured to receive a pressurized fluid and, for a given pressure and/or flow rate of pressurized fluid supplied to the fiber support channel, an optical fiber supported in the fiber support channel and subject to relatively low tension is positioned closer to the wider portion of the fiber support channel while an optical fiber supported in the fiber support channel and subject to relatively higher tension is positioned closer to the narrower portion of the fiber support channel.

14. The method of claim 11 wherein the fluid bearing redirects the optical fiber from a first pathway to a second pathway.

15. The method of claim 11 wherein the optical fiber enters and exits the fluid bearing along a first pathway.

16. The method of claim 11 wherein the position of the optical fiber in the fiber support channel is determined using a laser micrometer, a non-contact displacement sensor, an imaging device, or a combination thereof.

17. The method of claim 11 wherein the draw tension of the optical fiber is determined by comparing the determined position of the optical fiber in the fiber support channel to a table of known optical fiber tensions indexed according to the position of the optical fiber in the fiber support channel and specific pressures and/or flow rates of the pressurized fluid supplied to the fiber support channel.

18. The method of claim 11 wherein the position of the optical fiber in the fiber support channel is determined by capturing an image of the optical fiber in the fiber support channel and wherein the draw tension applied to the optical fiber is determined by overlaying the captured image of the optical fiber in the fiber support channel with a calibrated scale wherein the position of the optical fiber on the calibrated scale is indicative of the draw tension applied to the optical fiber.

19. The method of claim 11 wherein the position of the optical fiber in the fiber support channel is determined by capturing an image of the optical fiber in the fiber support channel and the draw tension applied to the optical fiber is determined by performing image analysis on the captured image of the optical fiber in the fiber support channel using image analysis software calibrated with fiber displacement measurements for various combinations of known draw tensions and pressures and/or flow rates of the pressurized fluid.

* * * * *